United States Patent
Brunetto (10) Patent No.: US 10,421,134 B2
(45) Date of Patent: Sep. 24, 2019

(54) TANGENTIALLY MOUNTED INDEXABLE CUTTING INSERT WITH CONVEX-SHAPED MINOR SIDE SURFACES AND CONCAVE-SHAPED END SURFACES

(71) Applicant: Kennametal Inc., Latrobe, PA (US)

(72) Inventor: Lance David Brunetto, Greensburg, PA (US)

(73) Assignee: KENNAMETAL INC., Latrobe, PA (US)

( * ) Notice: Subject to any disclaimer, the term of this patent is extended or adjusted under 35 U.S.C. 154(b) by 64 days.

(21) Appl. No.: 15/354,138

(22) Filed: Nov. 17, 2016

(65) Prior Publication Data
US 2018/0133813 A1    May 17, 2018

(51) Int. Cl.
*B23C 5/20* (2006.01)
*B23C 5/06* (2006.01)

(52) U.S. Cl.
CPC .............. *B23C 5/207* (2013.01); *B23C 5/06* (2013.01); *B23C 2200/0494* (2013.01); *B23C 2200/164* (2013.01); *B23C 2200/165* (2013.01); *B23C 2200/367* (2013.01)

(58) Field of Classification Search
CPC ........ B23C 2200/085; B23C 2200/205; B23C 2200/367; B23C 2200/0472; B23C 2200/0433; B23C 2200/0494
See application file for complete search history.

(56) References Cited

U.S. PATENT DOCUMENTS

| | | | |
|---|---|---|---|
| 5,542,795 A | 8/1996 | Mitchell | |
| 5,876,160 A | 3/1999 | Johnson | |
| 7,014,396 B2 * | 3/2006 | Satran | B23C 5/2213 407/103 |
| 7,040,844 B1 | 5/2006 | Daiguji | |
| 7,063,489 B2 * | 6/2006 | Satran | B23C 5/1072 407/113 |
| 7,073,987 B2 | 7/2006 | Hecht | |
| 7,094,007 B2 * | 8/2006 | Satran | B23C 5/06 407/113 |
| 7,104,735 B2 | 9/2006 | Johnson | |
| 7,104,736 B2 | 9/2006 | Satran | |
| 7,241,082 B2 * | 7/2007 | Smilovici | B23C 5/2221 407/113 |

(Continued)

FOREIGN PATENT DOCUMENTS

| DE | 60311001 | 2/2007 |
|---|---|---|
| DE | 602004013174 T2 | 7/2008 |

(Continued)

OTHER PUBLICATIONS

Sep. 17, 2018 Foreign OA.

*Primary Examiner* — Willmon Fridie, Jr.
(74) *Attorney, Agent, or Firm* — Matthew S. Bedsole (57) ABSTRACT

A cutting insert having two opposing end surfaces, two identical opposing major side surfaces and two identical opposing minor side surfaces. Each end surface of the insert has a concave-shaped seating surface for contacting the insert pocket the insert pocket along an entire length of the cutting insert. The minor side surfaces are convex-shaped. The concave-shaped seating surface and the convex-shaped minor side surfaces enable the cutting insert to be accurately tangentially mounted in the insert pocket.

19 Claims, 5 Drawing Sheets

(56) References Cited

U.S. PATENT DOCUMENTS

| | | | |
|---|---|---|---|
| 8,449,230 B2* | 5/2013 | Nguyen | B23C 5/109 407/113 |
| 8,690,494 B2 | 4/2014 | Fang et al. | |
| 8,876,440 B2* | 11/2014 | Nam | B23C 5/06 407/113 |
| 9,186,732 B2* | 11/2015 | Michelet | B23C 5/08 |
| 9,375,793 B2* | 6/2016 | Brunetto | B23C 5/207 |
| D778,330 S * | 2/2017 | Fang | D15/139 |
| 9,981,323 B2* | 5/2018 | Fang | B23C 5/2221 |
| 2011/0129309 A1* | 6/2011 | Kovac | B23C 5/06 407/42 |
| 2014/0212228 A1 | 7/2014 | Horiike et al. | |
| 2015/0117969 A1* | 4/2015 | Brunetto | B23C 5/207 407/42 |
| 2015/0183034 A1* | 7/2015 | Stark | B23C 5/109 407/48 |
| 2016/0039015 A1* | 2/2016 | Matsubara | B23C 5/207 407/114 |
| 2016/0167137 A1* | 6/2016 | Agic | B23B 27/1662 407/66 |

FOREIGN PATENT DOCUMENTS

| | | |
|---|---|---|
| DE | 202005021978 U1 | 12/2011 |
| DE | 102012214634 A1 | 12/2013 |
| DE | 102012108751 A1 | 3/2014 |
| DE | 102016109867 A1 | 1/2017 |

\* cited by examiner

TANGENTIALLY MOUNTED INDEXABLE CUTTING INSERT WITH CONVEX-SHAPED MINOR SIDE SURFACES AND CONCAVE-SHAPED END SURFACES

FIELD OF THE INVENTION

In general, the invention relates to a cutting insert, and in particular to a cutting insert for a milling cutter that is tangentially mounted in the cutter pocket with convex-shaped minor side surfaces and concave-shaped end surfaces.

BACKGROUND OF THE INVENTION

One problem encountered with tangentially mounting a cutting insert in the pocket is that it requires that the tangential seating surface be reduced to allow room for cutting edges and associated cutting geometry. The reduction in size of the tangential seating pad and the tendency for carbide to distort during manufacturing, makes it difficult to accurately locate the contact of the insert pad to the cutter pocket. In addition, multiple, planar seating arrangements lend themselves to smaller contact areas and inaccurate location of the contact. Thus, it would be desirable to provide a cutting insert that can be accurately tangentially mounted in the pocket of a cutting tool.

SUMMARY OF THE INVENTION

The problem of accurately tangentially mounting a cutting insert in the pocket is solved by providing minor side surfaces with a convex shape, and end surfaces with a concave-shaped seating surface that extends the length of the cutting insert.

The convex-shaped minor side surfaces allow for slight misalignment of the pocket with respect to the work piece without negatively effecting surface finish. This allows an increase in finish quality without the associated expense of a precision ground insert or unusually tight manufacturing tolerances The concave-shaped seating surfaces that extend the length of the cutting insert enable the cutting insert to have better control at the point of contact, thereby improving stability of the cutting insert when mounted in the cutter pocket.

In one aspect of the invention, a cutting insert comprises two opposing end surfaces, two opposing minor side surfaces extending between the two opposing end surfaces, and two opposing major side surfaces extending between the end surfaces and the minor side surfaces. Each end surface has four corners including two lowered corners and two raised corners. The two lowered corners are diagonally opposite each other, and the two raised corners are diagonally opposite each other. The cutting insert further includes two opposing major edges formed at an intersection of each end surface and the major side surfaces, two opposing minor edges formed at an intersection of each end surface and the minor side surfaces, and two opposing corner edges formed at an intersection of each the corner side surfaces and the major side surfaces. The cutting insert further includes a major cutting edge formed at an intersection of each major edge and the end surface, and a minor cutting edge formed at an intersection of each minor edge and the end surface, and a corner cutting edge formed at an intersection of the major and minor cutting edges. Each end surface includes a seating surface that extends from one lowered corner to the diagonally opposite lowered corner. The seating surface is in the form of a U-shaped groove having a first side support wall, a second side support wall and a bottom wall therebetween. The bottom wall is formed with a radius, R2, such that the bottom wall has a concave topography.

In another aspect, a cutting insert comprises two opposing end surfaces, two opposing minor side surfaces extending between the two opposing end surfaces, and two opposing major side surfaces extending between the end surfaces and the minor side surfaces. Each end surface has four corners including two lowered corners and two raised corners. The two lowered corners are diagonally opposite each other, and the two raised corners are diagonally opposite each other. The cutting insert further includes two opposing major edges formed at an intersection of each end surface and the major side surfaces, two opposing minor edges formed at an intersection of each end surface and the minor side surfaces, and two opposing corner edges formed at an intersection of each the corner side surfaces and the major side surfaces. The cutting insert further includes a major cutting edge formed at an intersection of each major edge and the end surface, and a minor cutting edge formed at an intersection of each minor edge and the end surface, and a corner cutting edge formed at an intersection of the major and minor cutting edges. Each minor side surface is formed with a radius, R1, such that each minor side surface has a convex topography In another aspect, a milling cutter comprises a plurality of insert pockets, wherein the cutting insert of the invention is seated in each of the plurality of insert pockets.

BRIEF DESCRIPTION OF THE DRAWINGS

While various embodiments of the invention are illustrated, the particular embodiments shown should not be construed to limit the claims. It is anticipated that various changes and modifications may be made without departing from the scope of this invention.

DETAILED DESCRIPTION OF THE INVENTION

Referring now to FIGS. 1-7, a cutting insert 10 is shown according to an embodiment of the invention. In general, the cutting insert 10 is indexable and tangentially mounted in a pocket of a milling cutter (not shown). The cutting insert 10 is typically manufactured by form-pressing and sintering carbide powders using methods well-known in the art. The cutting insert 10 is generally rectangular in shape and has two identical opposing end seating surfaces 12, two identical opposing minor side surfaces 14 extending between the two opposing end seating surfaces 12, two identical opposing major side surfaces 16 extending between the end surfaces 12 and the minor side surfaces 14. Each end surface 12 has 180° rotational symmetry about a first central axis A1 passing through the two end surfaces 12, each minor side surface 14 has 180° rotational symmetry about a second central axis A2 passing through the two minor side surfaces 14, and each major side surface 16 has 180° rotational symmetry about a third central axis A3 passing through the two major side surfaces 16. The second central axis A2 is perpendicular to the first central axis A1, and the third central axis A3 is perpendicular to the first central axis A1 and to the second central axis A2. The cutting insert 10 also includes four opposed corner side surfaces 18 extending between the minor and major side surfaces 14, 16 and the end surfaces 12.

Each end surface 12 has four corners; two diagonally opposite lowered corners 20 and two diagonally opposite raised corners 22. The lowered corners 20 are closer to the second central axis A2 than the raised corners 22. Each corner side surface 18 extends between the raised corner 22 of one of the two opposing end surfaces 12 and the lowered corner 20 of the other one of the two opposing end surfaces 12.

Two opposing major edges 32 are formed at the intersection of each end surface 12 and the major side surfaces 16, two opposing minor edges 34 are formed at the intersection of each end surface 12 and the minor side surfaces 14, and two opposing corner edges 36 are formed at the intersection of each the corner side surfaces 18 and the major side surfaces 16. A major cutting edge 38 is formed at the intersection of each major edge 32 and the end surface 12 and extends along substantially the entire length of its associated major edge 32. A minor cutting edge 40 is formed at the intersection of each minor edge 34 and the end surface 14 and extends along its associated minor edge 34. A corner cutting edge 42 is formed at the intersection of the major and minor cutting edges 38, 40. Because the cutting insert 10 is symmetric about all three axes, A1, A2 and A3, the cutting insert 10 has a total of four major cutting edges 38, four minor cutting edges 40 and four corner cutting edges 42.

Figure 1:
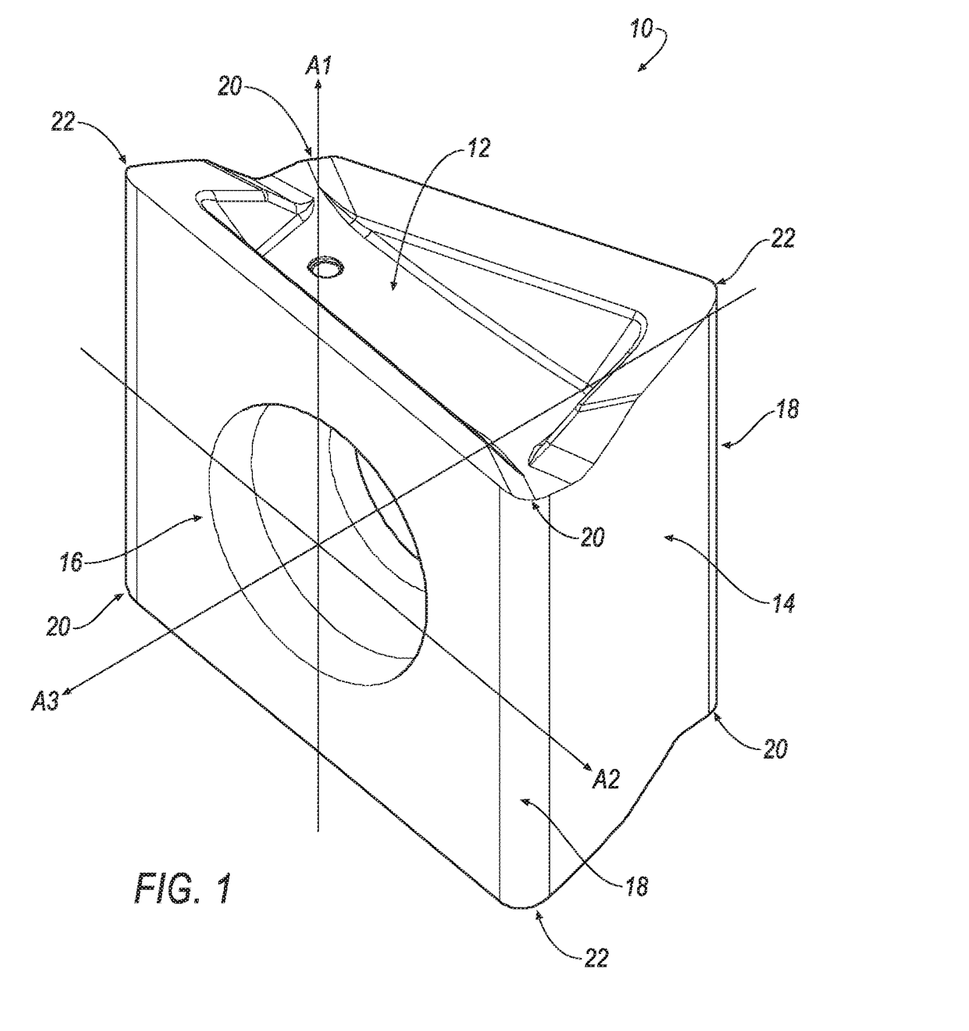
FIG. 1 is an isometric view of an exemplary embodiment of a cutting insert of the invention.
Figure 2:
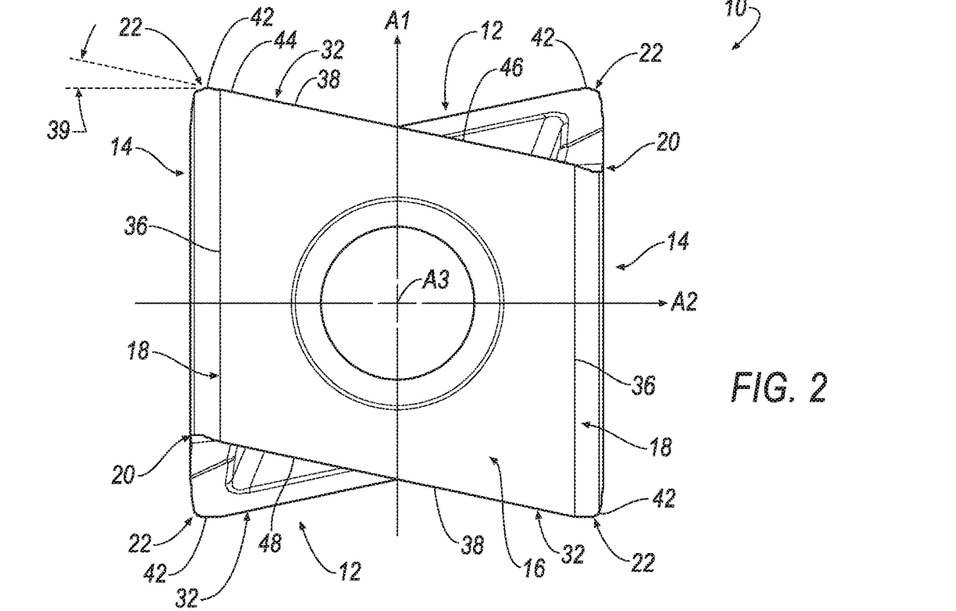
FIG. 2 is a front view of the exemplary embodiment of the cutting insert of FIG. 1.
Figure 3:
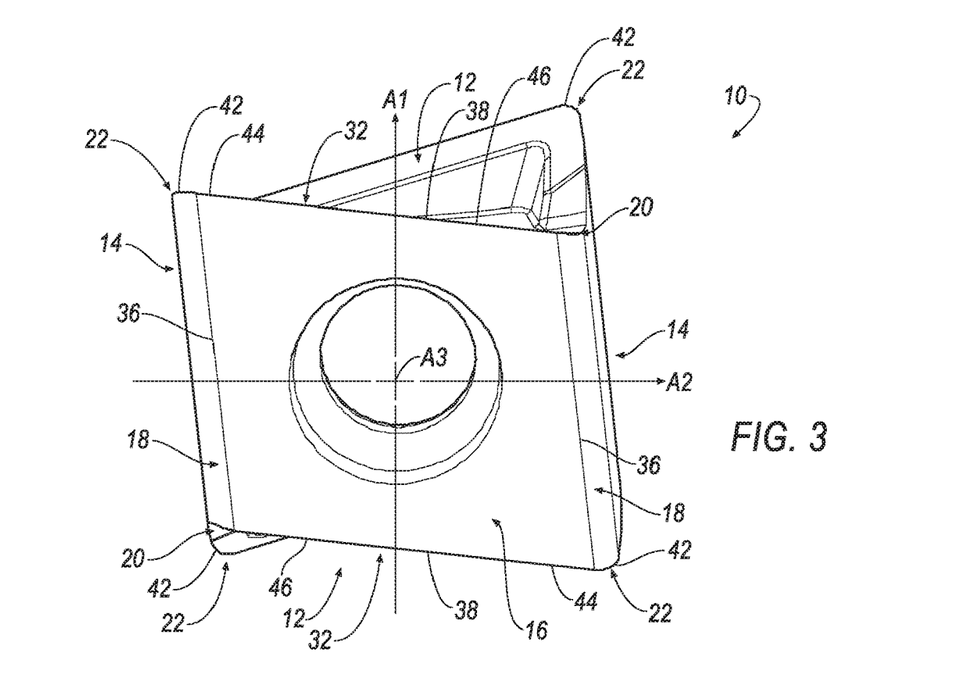
FIG. 3 is an isometric front view of the exemplary embodiment of the cutting insert of FIG. 1.
Figure 4:
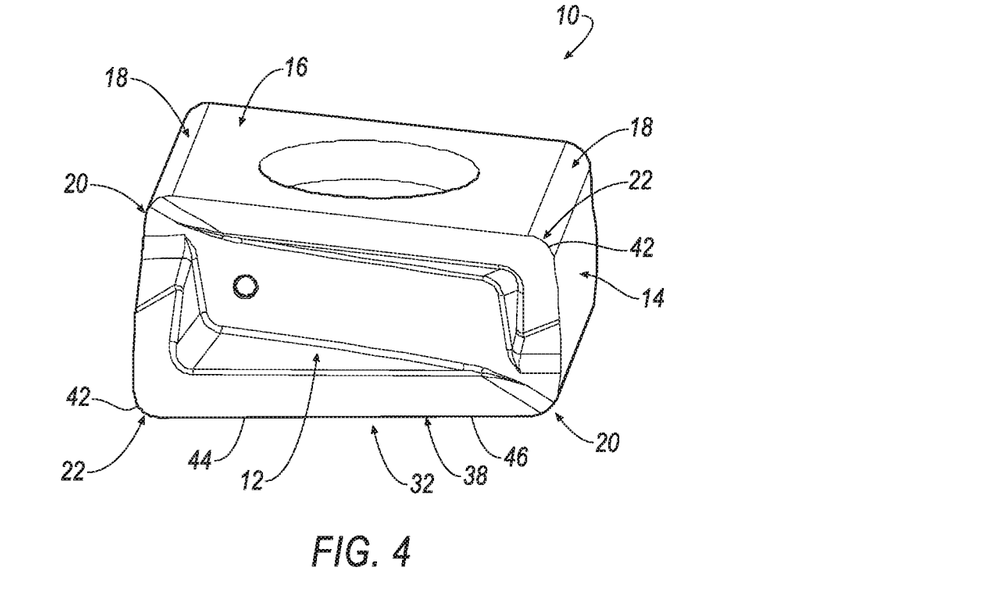
FIG. 4 is an isometric end view of the exemplary embodiment of the cutting insert of FIG. 1.

The section of the major cutting edge 38 proximate the raised corner 22 constitutes a leading end 44 of the major cutting edge 38, whereas the section of the major cutting edge 38 proximate the lowered corner 20 constitutes a trailing end 46 of the major cutting edge 38, as shown in FIGS. 2 and 3. The major cutting edge 38 is formed at an angle 39 with respect to the second axis, A2. The angle 39 may be in the range between about 5 degrees and about 10 degrees. For example, the angle 39 may be about twelve (12) degrees.

Figure 5:
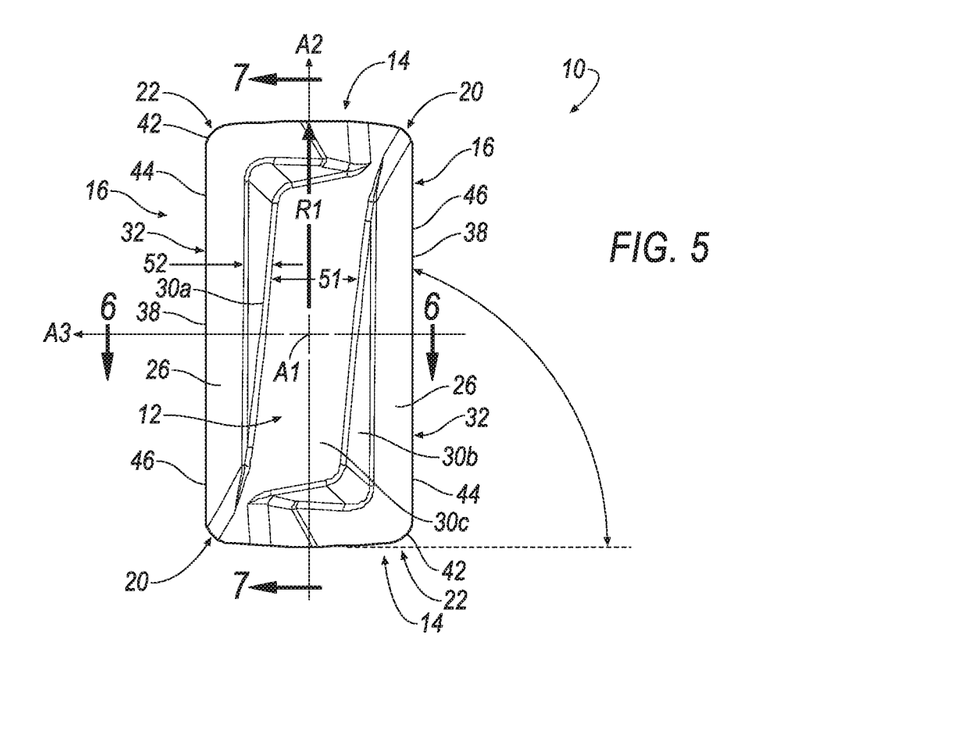
FIG. 5 is a top view of the exemplary embodiment of the cutting insert of FIG. 1.

Referring now to FIG. 5, one aspect of the invention is that each minor side surface 14 is formed with a large radius, R1. As a result, each minor side surface 14 has a convex topography. In one embodiment, the radius, R1, is in the range between about 0.75 inches (19.05 mm) to about 1.25 inches (31.75 mm). For example, in the illustrated embodiment, the radius, R1, is about 0.984 inches (25.00 mm). However, it will be appreciated that the invention is not limited by the magnitude of the radius, R1, and that the invention can be practiced with any desirable magnitude of the radius, R1, so long as the minor side surface 14 has a convex topography.

Figure 6:
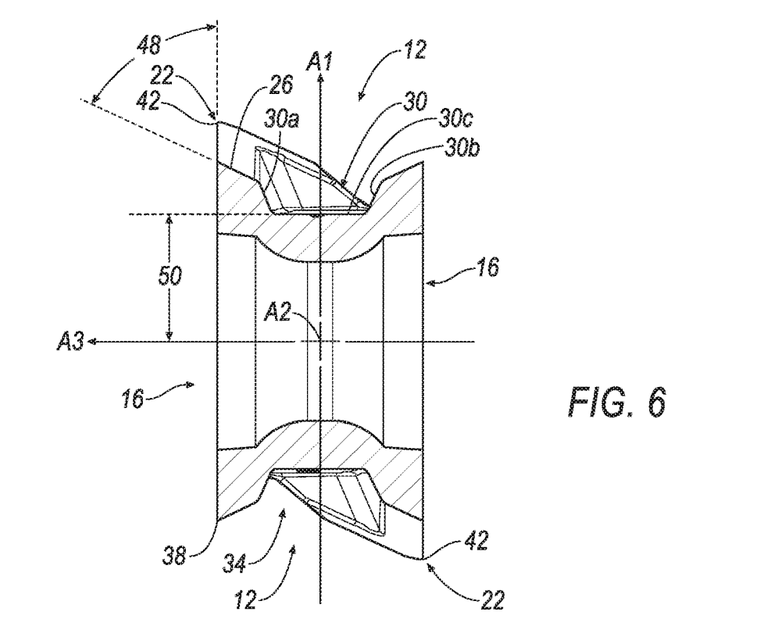
FIG. 6 is a cross-sectional view of the exemplary embodiment of the cutting insert taken along line 6-6 of FIG. 5.
Figure 7:
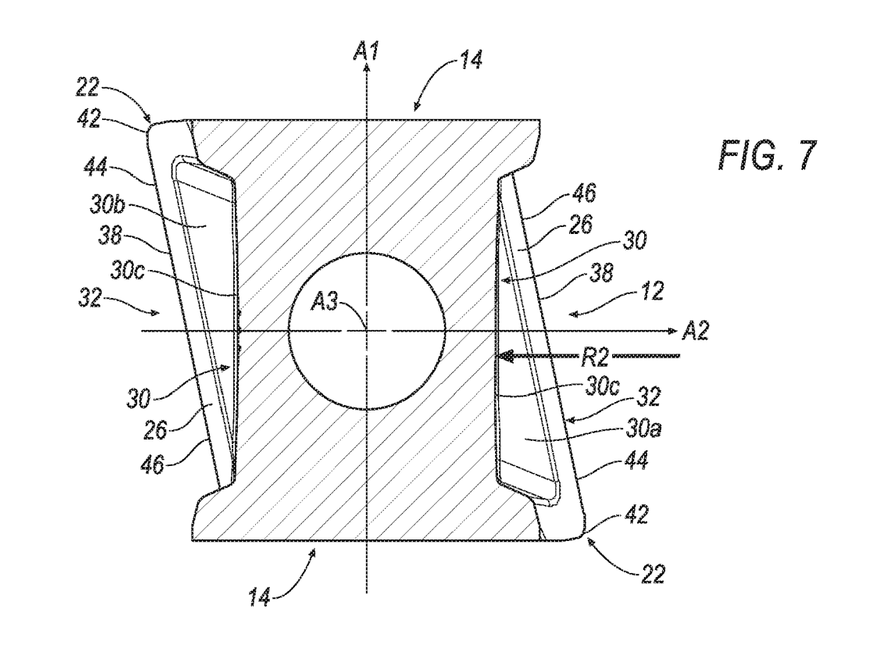
FIG. 7 is a cross-sectional view of the exemplary embodiment of the cutting insert taken along line 7-7 of FIG. 5.

Referring now to FIGS. 6 and 7, each end surface 12 of the cutting insert 10 has a seating surface 30 for contacting a pocket of a cutting tool 100 (FIGS. 8 and 9) that extends entirely from one lowered corner 20 to the diagonally opposite lowered corner 20 of the cutting insert 10. In the illustrated embodiment, the seating surface 30 is in the form of a U-shaped groove having side support walls 30a, 30b, and a bottom wall 30c formed between the two side support walls 30a, 30b. The two side support walls 30a, 30b extend from the bottom wall 30c to a rake surface 26 extending between the major edge 32 and the side support walls 30a, 30b Another aspect of the invention is that the bottom wall 30c is formed with a very large radius, R2. As a result, bottom wall 30c has a concave topography. In one embodiment, the radius, R2, is in the range between about 3.00 inches (76.2 mm) to about 5.00 inches (127.0 mm). For example, in the illustrated embodiment, the radius, R2, is about 3.937 inches (100.00 mm). However, it will be appreciated that the invention is not limited by the magnitude of the radius, R2, and that the invention can be practiced with any desirable magnitude of the radius, R2, so long as the bottom wall 30c has a concave topography.

As shown in FIG. 6, the rake surface 26 is formed at a rake angle 48 with respect to the first central axis A1. The rake angle 48 can be greater than 0 degrees and less than 90 degrees. In the illustrated embodiment, the rake angle 48 is about 65 degrees. However, it will be appreciated that the invention is not limited by the magnitude of the rake angle 48, and that the invention can be practiced with any desirable rake angle.

As shown in FIG. 6, a distance 50 between the bottom wall 30c and the third central axis, A3, remains constant across the entire length of the seating surface 30. In other words, the bottom wall 30c of the seating surface 30 is substantially coplanar along its entire length from one lowered corner 20 to the diagonally opposite lowered corner 20.

As shown in FIG. 5, the bottom wall 30c has a substantially constant width 51 along its entire length from one lowered corner 20 to the diagonally opposite lowered corner 20. On the other hand, the side support walls 30a, 30b have a continuously varying width 52 along their entire length from one lowered corner 20 to the diagonally opposite lowered corner 20. Specifically, the width 52 of the side support walls 30a, 30b are inversely proportional to each other. For example, the width of the side support wall 30a is a minimum, while the width 52 of the side support wall 30b is a maximum at the lowered corner 20, and the width 52 of the side support wall 30a is a maximum, while the width 52 of the side support wall 30b is a minimum at the diagonally opposite lowered corner 20. It is noted that the width 52 of each side support wall 30a, 30b is approximately equal to each other where the first central axis, A1, and the third central axis, A3, intersect each other, as shown in FIG. 5.

Figure 8:
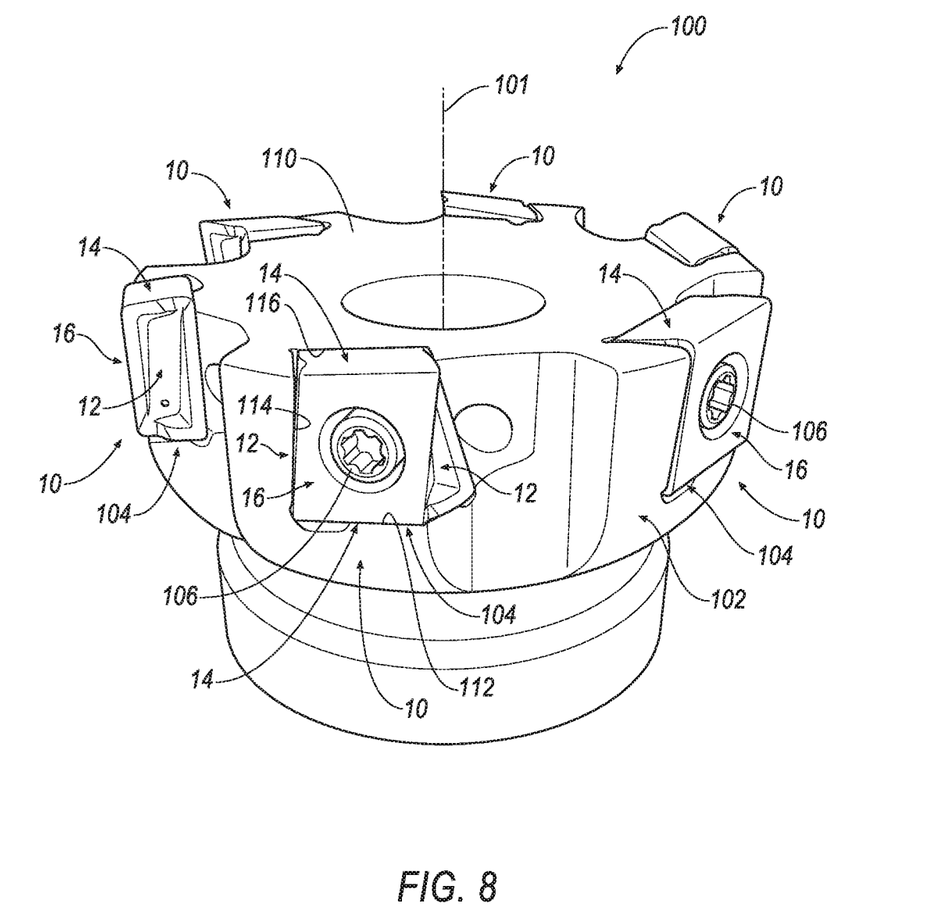
FIG. 8 is an isometric view of an exemplary embodiment of a milling cutter with the cutting insert seated in insert pockets.

Referring now to FIG. 8, a milling cutter 100 is shown according to an embodiment of the invention. The milling cutter 100 has an axis of rotation 101, and a cutter body 102 with a plurality of insert pockets 104. In each insert pocket 104, the cutting insert 10 of the invention is tangentially mounted to the cutter body 102 by means of a clamping screw 106. As can be seen, each cutting insert 10 is seated so that there is a clearance between a workpiece (not shown) and the minor side surface 14 of the cutting insert 10 and the face 110 of the milling cutter 100.

The insert pocket 104 includes a first side wall 112 and a second side wall 114 generally transverse to a bottom wall 116. Each wall 112, 114, 116 is generally planar. When seated in the insert pocket 104, one of the minor side surfaces 14 of the cutting insert 10 engages the first side wall 112, one of the end surfaces 12 engages the second side wall 114, and one of the major side surfaces 16 of the cutting inset 10 engages the bottom wall 116 of the insert pocket 104. Because the minor side surfaces 14 have a convex topography and the end surfaces 12 have a concave topography, the cutting insert 10 can be accurately mounted within the pocket 104, unlike conventional cutting inserts.

The patents and publications referred to herein are hereby incorporated by reference.

Having described presently preferred embodiments the invention may be otherwise embodied within the scope of the appended claims.

What is claimed is:

1. A cutting insert, comprising:
   two opposing end surfaces, two opposing minor side surfaces extending between the two opposing end surfaces, two opposing major side surfaces extending between the end surfaces and the minor side surfaces, each end surface having four corners comprising two lowered corners and two raised corners, the two lowered corners being diagonally opposite each other, the two raised corners being diagonally opposite each other;
   two opposing major edges formed at an intersection of each end surface and the major side surfaces, two opposing minor edges formed at an intersection of each end surface and the minor side surfaces, and two opposing corner edges formed at an intersection of each the corner side surfaces and the major side surfaces; and
   a major cutting edge formed at an intersection of each major edge and the end surface, and a minor cutting edge formed at an intersection of each minor edge and the end surface, and a corner cutting edge formed at an intersection of the major and minor cutting edges,
   wherein each end surface includes a seating surface that extends from one lowered corner to the diagonally opposite lowered corner,
   wherein the seating surface is in the form of a U-shaped groove having a first side support wall, a second side support wall and a bottom wall therebetween, and
   wherein the bottom wall is formed with a radius, R2, such that the bottom wall has a concave topography.

2. The cutting insert of claim 1, wherein each minor side surface is formed with a radius, R1, such that each minor side surface has a convex topography.

3. The cutting insert of claim 1, further comprising a rake face extending between the first and second side support walls and the major edge, wherein the rake face is formed at an angle with respect to a central axis A2 passing through the minor side surfaces of the cutting insert.

4. The cutting insert of claim 1, wherein the first and second side support walls have a continuously varying width.

5. The cutting insert of claim 1, wherein the bottom wall has a constant width.

6. The cutting insert of claim 1, wherein each minor side surface has 180° rotational symmetry about a central axis, A2, passing through the two minor side surfaces.

7. The cutting insert of claim 1, wherein each major side surface has 180° rotational symmetry about a central axis, A3, passing through the two major side surfaces of the cutting insert, and wherein a central axis, A2, is perpendicular to a central axis, A1, passing through the two end surfaces, and the central axis, A3, is perpendicular to the central axis, A1, and to the central axis, A2.

8. The cutting insert of claim 1, wherein the cutting insert further includes four opposed corner side surfaces between the minor and major side surfaces and the end surfaces.

9. The cutting insert of claim 1, wherein a section of the major cutting edge proximate the raised corner constitutes a leading end of the major cutting edge, and wherein a section of the major cutting edge proximate the lowered corner constitutes a trailing end of the major cutting edge.

10. A cutting insert, comprising:
    two opposing end surfaces, two opposing minor side surfaces extending between the two opposing end surfaces, two opposing major side surfaces extending between the end surfaces and the minor side surfaces, each end surface having four corners comprising two lowered corners and two raised corners, the two lowered corners being diagonally opposite each other, the two raised corners being diagonally opposite each other;
    two opposing major edges formed at an intersection of each end surface and the major side surfaces, two opposing minor edges formed at an intersection of each end surface and the minor side surfaces, and two opposing corner edges formed at an intersection of each the corner side surfaces and the major side surfaces; and
    a major cutting edge formed at an intersection of each major edge and the end surface, and a minor cutting edge formed at an intersection of each minor edge and the end surface, and a corner cutting edge formed at an intersection of the major and minor cutting edges,
    wherein each minor side surface is formed with a radius, R1, such that each minor side surface has a convex topography;
    wherein each end surface includes a seating surface that extends from one lowered corner to the diagonally opposite lowered corner,
    wherein the seating surface is in the form of a V-shaped groove having a first side support wall, a second side support wall and a bottom wall therebetween, and
    wherein the bottom wall is formed with a radius, R2, such that the bottom wall has a concave topography.

11. The cutting insert of claim 10, further comprising a rake face extending between the first and second side support walls and the major edge, wherein the rake face is formed at an angle with respect to a central axis A2 passing through the minor side surfaces of the cutting insert.

12. The cutting insert of claim 10, wherein the first and second side support walls have a continuously varying width.

13. The cutting insert of claim 10, wherein the bottom wall has a constant width.

14. The cutting insert of claim 10, wherein each minor side surface has 180° rotational symmetry about a central axis, A2, passing through the two minor side surfaces.

15. The cutting insert of claim 10, wherein each major side surface has 180° rotational symmetry about a central axis, A3, passing through the two major side surfaces of the cutting insert, and wherein a central axis, A2, is perpendicular to a central axis, A1, passing through the two end surfaces, and the central axis, A3, is perpendicular to the central axis, A1, and to the central axis, A2.

16. The cutting insert of claim 10, wherein the cutting insert further includes four opposed corner side surfaces between the minor and major side surfaces and the end surfaces.

17. The cutting insert of claim 10, wherein a section of the major cutting edge proximate the raised corner constitutes a leading end of the major cutting edge, and wherein a section of the major cutting edge proximate the lowered corner constitutes a trailing end of the major cutting edge.

18. A milling cutter, comprising:
a plurality of insert pockets; and
a cutting insert in accordance with claim 1 seated in each of the plurality of insert pockets.

19. The milling cutter of claim 18, wherein each minor side surface is formed with a radius, R1, such that each minor side surface has a convex topography.

* * * * *